(12) United States Patent
Schempp

(10) Patent No.: US 12,025,339 B2
(45) Date of Patent: Jul. 2, 2024

(54) HVAC RETURN FILTER HOLDER

(71) Applicant: Ryan Schempp, Bakersfield, CA (US)

(72) Inventor: Ryan Schempp, Bakersfield, CA (US)

( * ) Notice: Subject to any disclaimer, the term of this patent is extended or adjusted under 35 U.S.C. 154(b) by 245 days.

(21) Appl. No.: 17/232,240

(22) Filed: Apr. 16, 2021

(65) Prior Publication Data

US 2022/0065494 A1 Mar. 3, 2022

Related U.S. Application Data

(60) Provisional application No. 63/071,602, filed on Aug. 28, 2020.

(51) Int. Cl.
| | |
|---|---|
| *B01D 46/00* | (2022.01) |
| *B01D 46/02* | (2006.01) |
| *B01D 46/10* | (2006.01) |
| *B01D 46/52* | (2006.01) |
| *F24F 7/04* | (2006.01) |
| *F24F 8/50* | (2021.01) |
| *F24F 13/28* | (2006.01) |

(52) U.S. Cl.
CPC .......... *F24F 13/28* (2013.01); *B01D 46/0005* (2013.01); *B01D 46/001* (2013.01); *B01D 46/0028* (2013.01); *B01D 46/0038* (2013.01); *F24F 7/04* (2013.01); *F24F 8/50* (2021.01); *B01D 2265/024* (2013.01); *B01D 2279/35* (2013.01)

(58) Field of Classification Search
CPC .. B01D 46/00; B01D 46/0005; B01D 46/001; B01D 46/0028; B01D 46/0038; B01D 2265/024; B01D 2279/35; F24F 7/04; F24F 13/28

USPC ...... 55/357, 481, 385.1, 496, 506, 510, 511, 55/DIG. 31

See application file for complete search history.

(56) References Cited

U.S. PATENT DOCUMENTS

| | | | | |
|---|---|---|---|---|
| 4,889,542 A | * | 12/1989 | Hayes | B01D 46/10 D23/209 |
| 5,743,927 A | * | 4/1998 | Osendorf | B01D 46/521 55/497 |
| 5,944,860 A | * | 8/1999 | Mack | B01D 46/0005 55/497 |
| 8,021,454 B2 | * | 9/2011 | Braunecker | B01D 46/0091 55/483 |
| 8,157,881 B1 | * | 4/2012 | Anoszko | B01D 46/0006 55/497 |
| 8,388,714 B2 | * | 3/2013 | Kearsley | B01D 46/023 55/483 |
| 8,404,032 B2 | * | 3/2013 | Endo | B32B 15/20 55/486 |
| 9,132,373 B2 | * | 9/2015 | Loggins | B01D 46/4227 |
| 10,641,520 B2 | * | 5/2020 | Conrad | F24F 7/065 |
| 10,710,014 B2 | * | 7/2020 | Englund | B01D 46/523 |
| 10,712,027 B2 | * | 7/2020 | Gallo | F24F 8/80 |
| 10,773,197 B1 | * | 9/2020 | Bishop | F24F 13/085 |

(Continued)

*Primary Examiner* — Minh Chau T Pham
(74) *Attorney, Agent, or Firm* — Brennan, Manna & Diamond, LLC

(57) ABSTRACT

This present invention relates to a unique HVAC air filter holder designed to prevent or reduce air from escaping or otherwise bypassing the HVAC air filter. The HVAC air filter holder comprises a filter securing device, and is a material that is compressible, moldable, expansible or the like such that it can be secured around the perimeter of the air filter.

7 Claims, 3 Drawing Sheets

(56) References Cited

U.S. PATENT DOCUMENTS

| | | | | |
|---|---|---|---|---|
| 2011/0132198 A1* | 6/2011 | Gallo | ..................... | B01D 46/62 |
| | | | | 55/484 |
| 2014/0230385 A1* | 8/2014 | Schuld | ................... | B01D 46/10 |
| | | | | 55/481 |
| 2015/0096271 A1* | 4/2015 | Cole | .................. | B01D 46/4227 |
| | | | | 55/385.2 |
| 2022/0152542 A1* | 5/2022 | Williams | ............... | B01D 41/04 |
| 2022/0387919 A1* | 12/2022 | Bland | ................ | B01D 46/0002 |

* cited by examiner

HVAC RETURN FILTER HOLDER

CROSS-REFERENCE TO RELATED APPLICATION

The present application claims priority to, and the benefit of, U.S. Provisional Application No. 63/071,602, which was filed on Aug. 28, 2020 and is incorporated herein by reference in its entirety.

FIELD OF THE INVENTION

The present invention relates generally to the field of heating, ventilation, and air conditioning systems (HVAC). More specifically, the present invention relates to a replaceable HVAC filter holder for securing an HVAC filter in an upright and locked position during use at the intake of an HVAC system. Generally stated, the HVAC return filter holder comprises a foam rubber element that is shaped and sized to correspond with the shape and size of the return filter. The foam rubber element may be secured around the perimeter of the filter with a hook and loop type fastener, a removable or repositional adhesive, or any other suitable fastening means to secure the filter holder to the perimeter of the return filter. Alternatively, the HVAC return filter holder may have a frame which can be installed at the internal periphery of an HVAC filter grill, wherein the frame has a hinge at the outer surface and a groove at the inner surface. The hinge is used to secure the filter holder to the HVAC filter grill, and the groove receives the HVAC return filter to securely hold the filter in position. The HVAC return filter holder of the present invention reduces or prevents non-filtered air from entering the HVAC system, and helps to keep the air in a home or business filtered. In addition, the filter holder also serves as insulation, and helps seal and improve the integrity of the HVAC system air flow. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, every HVAC system likely has at least one (and often more than one) filter to protect the HVAC system from contamination such as particulate material, and to help purify the air passing though and being emitted from the system. The air filters are typically installed at one or both of the return vent(s) and supply vent(s), and protect against dust, dirt, allergens, bacteria, and other particles damaging the HVAC equipment, while also providing cleaner and potentially germ-free air. Without such air filters, the HVAC system may not function properly or efficiently, and the useful life of the HVAC system may be decreased.

A return or supply vent filter keeps the air handler, ducts, and coils clean by filtering out particulates at the point of air intake, and prevents the accumulation of debris from building up in elbows and other areas of the ventilation system. The return and supply vent filters act as the first line of defense. Many times, the return vent of the HVAC system is on the ceiling and the return filter lifts and falls each time the HVAC unit turns on and off. Further, whenever the return vent grill is opened by a user, the filter oftentimes falls out of its holder, which can cause the accumulated dust to be released from the dirty filter and back into the air.

Additionally, due to the gaps between the filter and the filter housing within the intake grill boundaries, the filter is loosely secured (if at all), and air can pass around the edges of the filter or space between the housing and filter (often referred to as filter bypass), thereby resulting in potentially dirty and unhealthy air entering into the HVAC system, and then being distributed throughout a home or a business. This results in a decrease of collection efficiency and defeats the intended purpose of the filtration system of the HVAC system, namely, removing dust, particulate, microbes, bacteria and other airborne elements from the air being circulated.

Moreover, regular changing HVAC filters is necessary since the filters can become clogged with dust and debris. During the changing of the filters, the filters can fall off and cause injury to the person changing the filter, as well as allowing the accumulated debris to be discharged from the filter and back into the air due to the impact of the filter hitting the individual or other surface.

Therefore, there exists a long felt need in the art for a HVAC filter holder that eliminates the problem of filter bypass that causes air to escape around the filter and through the housing. There is also a long felt need in the art for a HVAC filter holder that secures the air filter in an upright and locked position, and that does not let the filter fall off when the filter grill housing is opened for maintenance or replacement of the air filter. Additionally, there is a long felt need in the art for a HVAC filter holder that increases the overall efficiency of the filtration system of an HVAC system, and that prevents the filter from falling each time the HVAC unit turns on and off. Moreover, there is a long felt need in the art for a HVAC filter holder that reduces noise, keeps the air directed into the air filter, and prevents the air from traversing around the edges of the filter. Finally, there is a long felt need in the art for a relatively lightweight and cost-effective HVAC filter holder that can be purchased by a consumer along with a filter to keep the air in a home or business filtered, thereby eliminating exposure of the occupants therein to contaminated air.

The subject matter disclosed and claimed herein, in one embodiment thereof, comprises an HVAC filter holder for a return air filter having one or more foam rubber or other expansible or compressible elements shaped to accommodate the return filter dimensions. More specifically, the foam rubber or expansible or compressible elements are secured around the perimeter of the filter with a fastener, such as a hook and loop fastener, removable or repositional adhesive or any other similar fastening mechanism, to secure the filter holder to the perimeter of the return filter, and reduce or eliminate filter bypass. The foam rubber, expansible or compressible element is further configured to be installed at an intake of an HVAC system. The HVAC filter holder may also have an adhesive positioned on the outer surface of the filter holder which is securely attached to the filter grill. The HVAC filter holder of the present invention provides an easy to install and cost-effective solution to preventing filter bypass, and increasing filter efficiency of the HVAC unit. Further, the noise associated with the operation of the HVAC unit, namely caused by the lifting and falling of the filter when the system is turned on and off, is reduced as the filter is secured by a snug fitting arrangement within the vent.

In this manner, the novel HVAC filter holder of the present invention accomplishes all of the forgoing objectives, and provides a relatively safe, easy, convenient and cost-effective product to prevent and or reduce air from escaping past an HVAC air filter as the filter is held in an upright and locked position. The novel HVAC filter holder of the present invention is also user friendly, inasmuch as it is relatively inexpensive and does not require the user to put much effort or labor into installing the same and/or changing the HVAC air filter.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

As used herein, the terms "HVAC air filter", "air filter" or "return filter" refer to a device typically composed of fibrous or porous materials which removes solid particulates, such as dust, pollen, mold and bacteria from the air. Different types of filters, such as a HEPA Filter, Pleated Media Filter, Flat-Paneled Fiberglass Filter and Reusable Air Filter, are included under the scope of the air filters contemplated for use in conjunction with the filter holder of the present invention.

The subject matter disclosed and claimed herein, in one embodiment thereof, comprises a unique and novel HVAC return filter holder to securely support an HVAC return filter within the filter enclosure, and prevent or at least significantly reduce air from escaping past or around the filter edges. The HVAC return filter includes a frame of foam rubber or other suitable material that is compressible, expansible or otherwise moldable. The frame is generally conformable to the shape and dimensions of the HVAC return filter to be enclosed by the conformable material frame. The frame has an exterior surface and an interior surface, wherein the interior surface is comprised of a plurality of grooves along its periphery to receive the edges of the HVAC return filter. Further, the exterior surface is comprised of an adhesive or other fastener to secure the holder against the filter grill, thereby substantially reducing or eliminating any gaps between the HVAC return filter and the filter grill housing by which air may escape. The unique HVAC return filter holder also keeps the HVAC return filter secure, such that the filter will not does rise and fall when the HVAC unit is started or stopped.

In a further embodiment of the present invention, a unique HVAC return filter holder to securely support an enclosed HVAC return filter and prevent or reduce air from escaping around the HVAC return filter is disclosed. The frame of the HVAC return filter holder is constructed from a malleable material, such as foam rubber or other compressible elements, and is modified to match the shape and dimensions of the HVAC return filter to be enclosed by the frame. The frame has an exterior surface and an interior surface, wherein the interior surface has a fastening means disposed along the periphery so as to attach the HVAC return filter to the frame. The exterior surface of the frame may also have an adhesive to secure the frame holder against the filter grill, which helps eliminate any gaps between the HVAC return filter and the filter grill through which unfiltered air may otherwise escape. The unique HVAC return filter holder keeps the HVAC return filter secure within the vent, and does not permit the same to rise and fall when the HVAC unit is started or stopped.

In yet a further embodiment of the present invention, a replaceable HVAC filter kit is disclosed, and includes a replaceable HVAC return filter and a filter holder. The filter holder encloses or surrounds the perimeter of the HVAC return filter, and is securely attached to a filter grill in which the HVAC return filter is installed. The filter holder has a frame with an outer surface and an inner surface. The inner surface has grooves to securely receive the HVAC return filter, and the outer surface has a hinge on each edge of the filter holder that is used to secure the filter holder to the HVAC filter grill during use. The unique HVAC return filter holder always keeps the HVAC return filter secure and in proper position, and the filter does not lift or fall when the HVAC unit is started or stopped. Each of the filter and the holder included in the kit are washable, and may be comprised of a biodegradable, recycled or renewable material. The filter itself is also comprised of a filter media for filtering germs, dirt, microbes and other undesirable particulates from the air.

In each of the embodiments of the present invention described herein, the HVAC filter holder frame is shaped and sized to accommodate the filter frame. The HVAC filter holder frame is relatively flexible to fit securely around the filter frame so as to eliminate, or at least reduce, air from bypassing the filer (e.g., via gaps that may otherwise exist). The exterior/outer surface of the filter holder may be bonded using a fastener, such as an adhesive, or be fixed through a hinge or any other mechanical fastener to the filter grill. The interior or inner surface of the filter holder also comprises a groove and a fastener to receive and attach to the filter. Further, the filter holder of the present invention may be presented as either a disposable or a reusable device depending on the needs and/or preferences of the user.

In yet a further embodiment of the present invention, a method of eliminating gaps between an HVAC air filter and filter grill in which the HVAC air filter is installed is disclosed. The method includes the initial step of encasing the air filter within the air filter holder of the present invention. The air filter holder is shaped and sized to fit within the air filter housing. Next, the filter holder is placed within the encased air filter housing or inside a filter grill, depending on the particular application. Once installed, the filter holder is secured to the filter grill using a fastening mechanism, such as an adhesive or a mechanical fastener.

In a still further embodiment of the presently described invention, a unique HVAC return filter holder is disclosed. The HVAC return filter holder comprises a frame that is sized to fit within a return air filter housing. The HVAC filter holder expands the surface area of the encased air filter while being positioned in between the filter and a grill, thereby eliminating or reducing any gaps that would otherwise allow air to bypass the filter. Additionally, the filter holder is secured to the grill using the mechanical fastener such as a flap, screw or the like.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
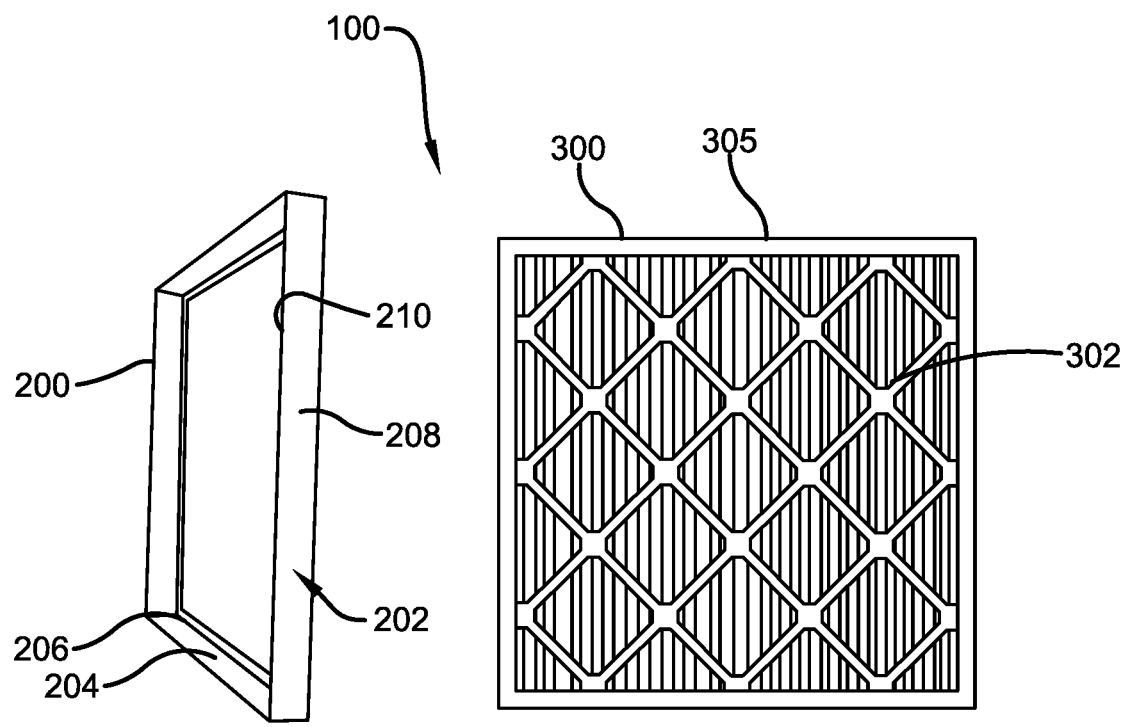
FIG. 1 illustrates a perspective and partially exploded view of one potential embodiment of an HVAC filter kit of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an HVAC filter holder that can eliminate the problem of filter bypass, which involves air escaping around the edges of the air filter or air passing through gaps that may exist between the filter and the filter housing. There is also a long felt need in the art for an HVAC filter holder that retains the air filter in a secure position, and does not let the filter fall off when the filter grill is opened for maintenance. Additionally, there is a long felt need in the art for an HVAC filter holder that increases the efficiency of the HVAC system, and that prevents the filter from lifting or falling each time the HVAC unit powers on and off. Moreover, there is a long felt need in the art for an HVAC filter holder that reduces the overall noise associated with the operation of the HVAC system, and that is relatively inexpensive to manufacture and both safe and easy to use.

The present invention, in one exemplary embodiment, is a unique HVAC return filter holder for securely supporting an HVAC return filter, and preventing (or at least reducing) air from bypassing the HVAC return filter. The holder comprises a frame of foam rubber or other conformable, malleable or expansible material. The frame has a shape and dimensions that correspond to the perimeter of the HVAC return filter to be enclosed thereby, and an exterior surface and an interior surface. The interior surface is further comprised of one or more grooves along its periphery to receive the edges of the HVAC return filter, and the exterior surface has an adhesive or other fastening means to secure the HVAC return filter holder against the filter grill, there eliminating (or at least reducing) any air gaps or spaces between the HVAC return filter and the filter grill. The unique HVAC return filter holder retains the HVAC return filter in a fixed position so that the same does not lift or fall when the HVAC unit is powered on or off.

Referring initially to the drawings, FIG. 1 illustrates a perspective and partially exploded view of one potential embodiment of an HVAC filter holder 200 of the present invention in accordance with the disclosed architecture and an associated HVAC air filter 300. More specifically, an HVAC filter kit 100 may comprise both the HVAC filter holder 200 and the HVAC air filter 300. The air filter 300 is a return air filter installed at a return vent of an HVAC system, and is typically rectangular or square in shape. However, the HVAC filter holder 200 of the present invention is not so limited, and may conform to any geometric or non-geometric shape of the HVAC air filter 300.

The HVAC air filter 300 further comprises a filter media 302 through which a flow of forced air passes, and an air filter frame 305 for supporting the air filter media 302 around its perimeter. The filter media 302 removes solid particulates, such as dust, pollen, mold, bacteria and other undesirable microbes from the air intake by the return vent. As previously stated, the air filter 300 can be any HVAC filter known in the art including, without limitation, a HEPA Filter, Pleated Media Filter, Flat-Paneled Fiberglass Filter, Reusable Air Filter or any other type of filter for filtering a stream or flow of forced air. Further, the filter media 302 can be, but is not limited to, a Hog hair filter media, Fiberglass media, Carbon pad, Merv 8/10 anti-microbial media, Poly dry media or any other similar media that is capable of capturing germs, dirt, microbes, particulates and the like. Most disposable air filters have a thickness of about 1 inch (measured from a first face of the filter to the second face of the filter through which the flow of forced air passes) for HVAC applications, and reusable air filters typically have a width ranging from between 1 to 4 inches, depending on the size of the unit. Accordingly, the individual moldable elements of the air filter frame 305 typically have approximately the same width as the air filter 300.

The filter holder 200 extends around the perimeter of the air filter frame 305 and is, accordingly, sized and shaped to correspond to the same. The HVAC filter holder 200 is further comprised of an exterior surface 202, an interior surface 204 and a continuous opening 210, wherein the interior surface 204 further comprises at least one groove 206, as best shown in FIG. 1. In use, the air filter 300 is inserted into the grooves 206 present in the interior surface 204 of the filter holder 200. The exterior surface 202 may further comprise a release liner 208 covering an adhesive, which is removed in order to attach the filter holder 200 to a filter grill in which the air filter 300 is to be installed. More specifically, the HVAC filter holder 200 is positioned between the filter grill and the air filter 300, thereby sealing any gaps that may exist therebetween which may otherwise permit forced air to bypass the air filter 300. The air filter 300 can be replaced when the same becomes clogged or dirty, and the HVAC filter holder 200 of the present invention may also be replaced at the same time. Alternatively, the HVAC filter holder 200 may be cleaned and reused with a new air filter 300.

Additionally, the HVAC filter holder 200 is relatively flexible and can fit snugly between the air filter 300 and the filter grill, which is normally installed in a ceiling or in a wall where an air return or air supply may be found. In one embodiment, the filter holder 200 is comprised of a malleable material, such as a foam rubber with an adhesive on the exterior surface 202. The foam rubber may be a neoprene type of material, such as chloroprene rubber (CR), styrene-butadiene rubber (SBR), ethylene-propylene-diene-monomer (EPDM) and the like. Other materials that may be used include polyurethane, latex, etc. Regardless of the specific material utilized, the same should satisfy fire resistance standard UL-94, flame class 94V-O and any equivalent ISO standard. The material used to manufacture the filter holder 200 is relatively lightweight, cost-effective, nonabsorbent and useful for thermal insulation. The material also helps in noise reduction of the HVAC system in which the filter holder 200 is deployed as a protective covering for the air filter 300.

Alternatively, the exterior surface 202 may have mechanical fasteners (as opposed to an adhesive) that allow the installation of the filter holder 200 into the filter grill, or may function as a friction or interference fit. The filter holder 200 may be provided as a single complete frame, or may be constructed from individual segments to create a frame and allow a user to create individual or unique sizes and shapes to fit the air supply duct or return. The filter holder 200 eliminates any gaps or spaces between the air filter 300 and the filter grill to eliminate (or at least reduce) the flow of forced air from bypassing the air filter 300, thereby increasing the overall efficiency of the HVAC filtration system. Further, the filter holder 200 prevents the filter 300 from lifting or falling each time that the HVAC unit turns on and off and ensures that the incoming flow of air is directed into the filter media 302 for proper filtering.

As noted above, the filter holder 200 may be removably attached to the filter grill, which allows the filter holder 200 to be removed easily, thereby making it reusable and extending the useful life of the filter holder 200. There are many alternative means for attaching the filter holder 200 to the grill. For example, the filter holder 200 may be manufactured with one or more ridges that can be snap-fitted into the receiving grooves in the grill. The filter holder 200 may also be of any suitable shape and size as per the dimensions of the air filter 300 including, but not limited to, rectangular, square, circular, or any other shape.

Figure 2:
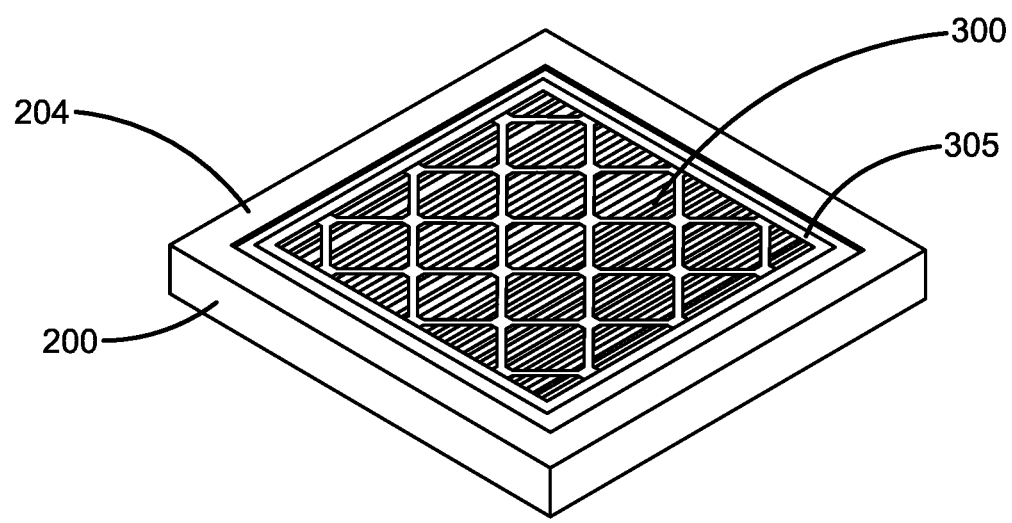
FIG. 2 illustrates a perspective view of one potential embodiment of an HVAC return filter holder of the present invention in accordance with the disclosed architecture, wherein the filter holder is removably attached to an HVAC air filter.

FIG. 2 illustrates a perspective view of one potential embodiment of an HVAC return filter holder 200 of the present invention in accordance with the disclosed architecture, wherein the filter holder 200 is removably attached to an HVAC air filter 300. During the installation process, the air filter 300, such as an HVAC return air filter, is inserted into the opening 210 in the relatively flexible HVAC filter holder 200 such that the grooves 206 along the interior surface 204 of the HVAC filter holder 200 receive the air filter frame 305, and the filter 300 is securely and removably inserted into the opening 210 such that no gaps or spaces are left between the interior surface or perimeter 204 of the HVAC filter holder 200 and the outer perimeter of the air filter frame 305.

In one embodiment, the interior surface 204 of the HVAC filter holder 200 may have hook and loop type fasteners (not shown) to attach to the air filter 300. Alternatively, the interior surface 204 of the HVAC filter holder 200 may have a channel to receive the outermost perimeter of the HVAC air filter frame 305. The HVAC filter holder 200 acts as a protective cover for the HVAC air filter 300 and fits around the perimeter of the filter frame 305 to hold the filter 300 in a secure and an upright position.

The HVAC filter holder 200 may further comprise retaining flanges on each interior edge to releasably place the air filter 300 along the interior surface 204 of the HVAC filter holder 200. The flanges lock the air filter frame 305 with the HVAC filter holder 200, wherein the flanges may flex to allow the air filter 300 to be inserted into the continuous opening 210 in the air filter holder 200. Further, to replace or remove the air filter 300 from the HVAC filter holder 200, the flanges can be removed or, alternatively, if the grooves 206 are present in the interior surface 204 of the HVAC filter holder 200, a user may slightly pull on the edges of the air filter frame 305 to pull the air filter 300 out of the grooves 206.

Figure 3:
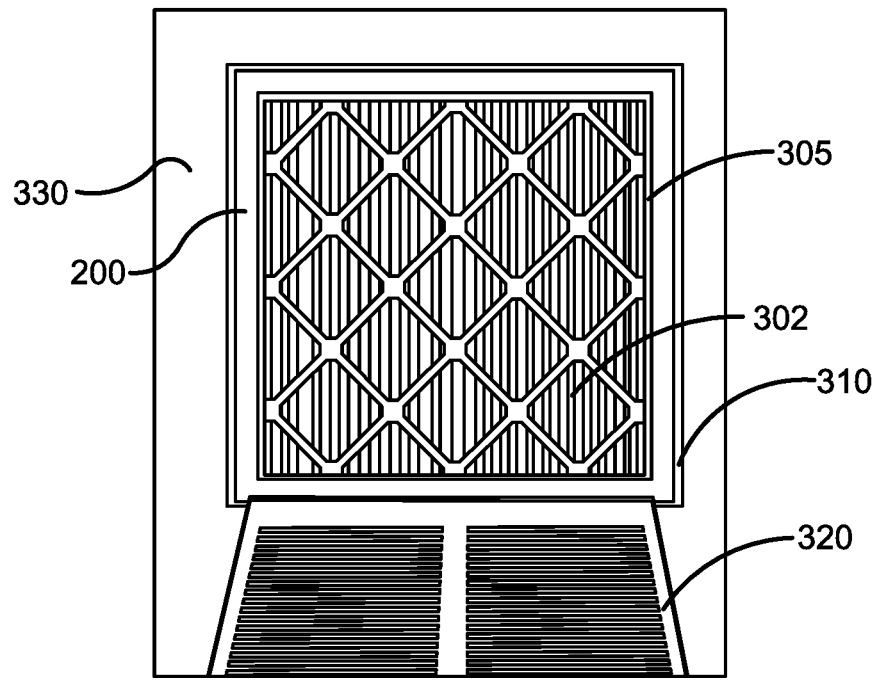
FIG. 3 illustrates a perspective view of one potential embodiment of an HVAC return filter holder of the present invention in accordance with the disclosed architecture, wherein the filter holder is removably attached to an HVAC air filter and installed in an HVAC system.

FIG. 3 illustrates a perspective view of one potential embodiment of an HVAC return filter holder 200 of the present invention in accordance with the disclosed architecture, wherein the filter holder 200 is removably attached to a HVAC air filter 300 and installed in an HVAC system. More specifically, the HVAC filter holder 200 of the present invention encases an HVAC air filter 300 installed in a filter grill 310 in a ceiling 330 or other surface, wherein the vent cover 320 is in an open position to provide access to the air filter 300. The return filter grill 310 is typically substantially rectangular or square in shape, and may have one or more latches to removably attach a filter holder 200 around the inner periphery. The HVAC filter holder 200 is installed in the filter grill 310 around the inner surface, and then the air filter frame 305 and accompanying filter media 302 is inserted into the opening 210 in the filter holder 200. In this manner, the filter holder 200 is always securely positioned between the air filter frame 305 and the filter grill or housing 310, and all of the intake air is passed only through the filter media 302 for filtration, and does not pass around the filter frame 305. Nonetheless, the filter holder 200 can be easily removed from the vent by gently pulling the filter holder 200 in the direction of the vent cover 320 when it is in the open position. Further, the material that comprises the filter holder 200 of the present embodiment expands the filter frame 305 while being positioned between the filter frame 305 and filter grill housing 310.

The filter holder 200 improves the overall efficiency of the air filter 300 as the flow of intake air passes only through the filter media 302, wherein unwanted particulates are removed by the filter media 302. The filter holder 200 also extends the life of the HVAC unit by preventing the unwanted particulates from passing beyond the air filter 300, and eliminates the risk of mold and microbial growth build up within the unit. The filter holder 200 can work with any type or brand of HVAC unit having a filter. Further, the filter holder 200 may further comprise antimicrobial and antifungal properties, or combinations of those, in the form of a coating or the like to help eliminate germs, bacteria and other airborne pathogens.

Figure 4:
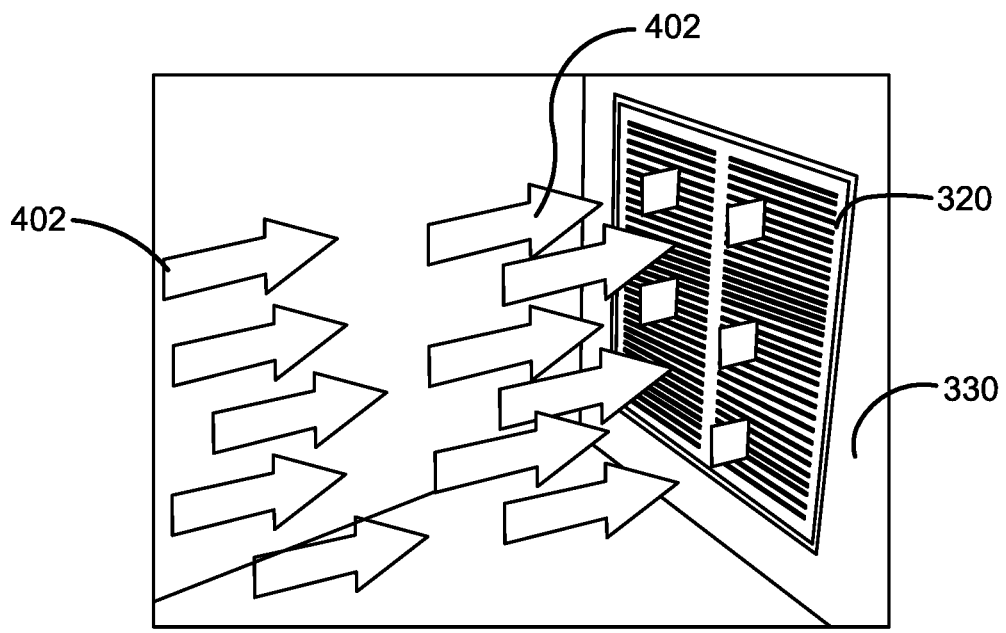
FIG. 4 illustrates a perspective view of one potential embodiment of an HVAC return filter holder of the present invention in accordance with the disclosed architecture, wherein the filter holder is removably attached to an HVAC air filter and installed in an operating HVAC system to filter the flow of air passing therethrough.

FIG. 4 illustrates a perspective view of one potential embodiment of an HVAC return filter holder 200 of the present invention in accordance with the disclosed architecture, wherein the filter holder 200 is removably attached to an HVAC air filter 300 and installed in an operating HVAC system to filter the flow of air 402 passing therethrough. More specifically, the grill cover 320 is hinged to the grill frame, and is repositionable between a closed position as shown in FIG. 4 and an open position as shown in FIG. 3.

The operation of the HVAC unit pulls a flow of outer air 402 into the vent through the grill cover 320, wherein it then passes through the filter media 302 of the air filter 300 and cleaned. Further, the presence of the air filter holder 200 of the present invention prevents the flow of air 402 from bypassing the filter 300.

The filter holder 200 can be installed rapidly and easily, and can hold a variety of bag filters and/or compact filters. The filter holder 200 comes in a comprehensive range of standard dimensions to accommodate various types of air filters 300, and is suitable for homes, commercial and industrial HVAC units. The filter holder 200 can be used in both a return vent and a supply vent to prevent the circulation unclean air.

The filter holder 200 of the present invention may come in a pack of one or more holders, and may also be available as a safety accessory with the HVAC return filter. Consumers can purchase the filter holder 200 each time they purchase a filter 300, and the filter holder 200 may also come with a marking, such as an "arrow" on its surface, indicating the direction in which the filter holder 200 is inserted or installed in the filter grill. In one embodiment of the present invention, the frame holder 200 may be manufactured from a variety of materials including, but not limited to, plastic, metal or cardboard. The filter media 302 may be manufactured from a variety of materials commonly known in the art, one material being polyester.

The filter holder 200 and the filter 300 may be made available in different sizes and colors to accommodate user need and/or preference, and the exact size, measurement, construction and design specifications of the present invention may vary upon manufacturing or the particular material that is used. The filter holder 200 may further include logos, indicia, trademarks, geometric patterns, customizable colors and fonts, embroidery and prints and/or images on its surface.

Figure 5:
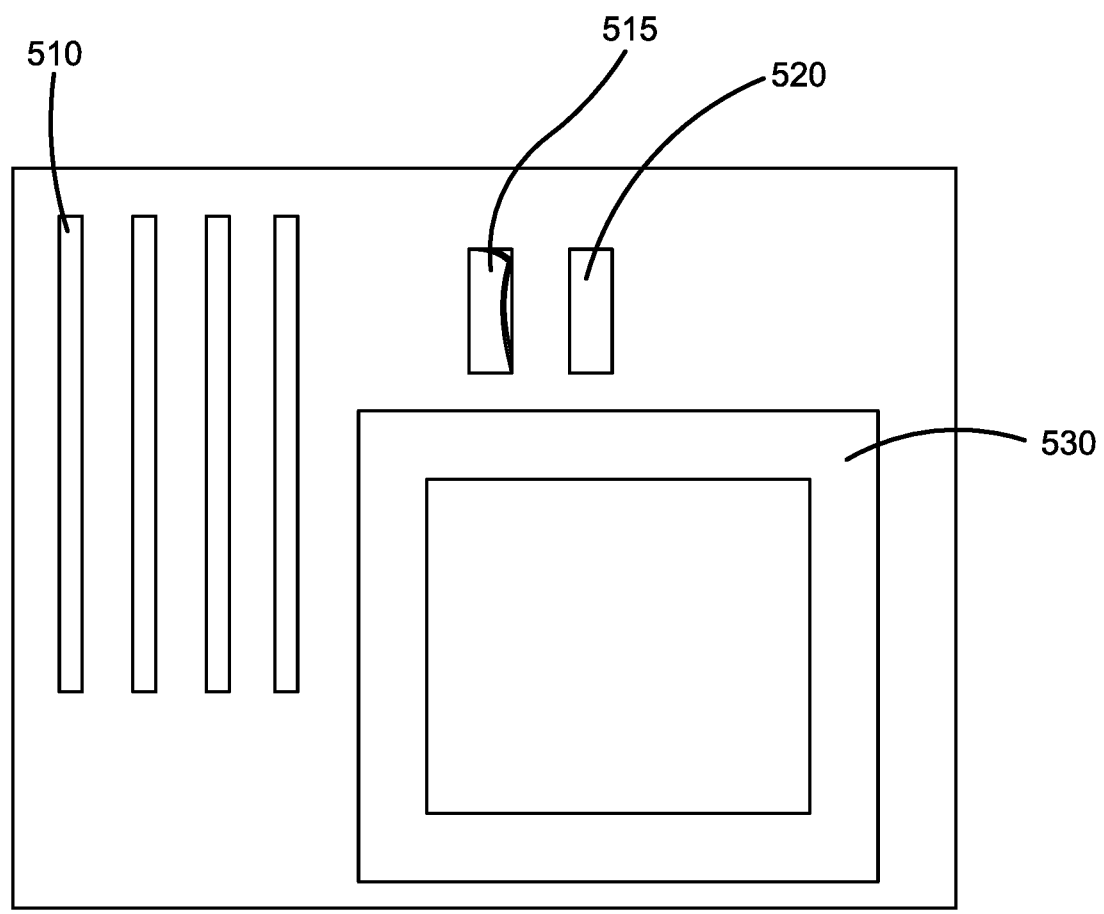
FIG. 5 illustrates a perspective view of one potential embodiment of an HVAC filter kit of the present invention in accordance with the disclosed architecture, wherein the kit comprises an HVAC return filter holder, a plurality of fasteners, strips, etc.

FIG. 5 illustrates a perspective view of one potential embodiment of a HVAC filter kit 500 of the present invention in accordance with the disclosed architecture, wherein the kit 500 comprises a HVAC return filter holder 200, a plurality of fasteners, strips, etc. More specifically, the kit 500 may comprise several individual sections 510 of a conformable, compressible, malleable, expansible or moldable material which may be used by the installer to create a custom air filter holder 200 for the air filter 300. The kit 500 may further include hook and loop attachment fasteners 515 and adhesive strips 520 to attach the holder 200 to the air filter 300. Other fasteners may be used for the installation. The kit 500 may also include an air filter frame 530 which has been previously formed to fit a common size air filter or filter housing.

In a further embodiment, the filter holder 200 and/or the HVAC filter 300 included in the kit 500 may be coated or infused with a fragrance that is dispersed into the air 402 passed through the filter media 302. The fragrance may be selected from any number of scents or essential oils, such as cedar, pine, sandalwood, lavender, tea tree, *eucalyptus*, rosemary, peppermint or spearmint.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "HVAC return air filter folder", "filter holder", "holder", and "HVAC filter holder", are interchangeable and refer to the HVAC return air filter folder 200 of the present invention. Similarly, as used herein "HVAC return air filter", "air filter" and "filter" are interchangeable and refer to the HVAC return air filter 300 of the present invention.

Notwithstanding the forgoing, the HVAC return air filter holder 200 of the present invention can be of any suitable size and configuration as is known in the art without affecting the overall concept of the invention, provided that it accomplishes the above stated objectives. One of ordinary skill in the art will appreciate that the size, configuration and material of the HVAC return air filter folder 200 as shown in the FIGS. are for illustrative purposes only, and that many other sizes and shapes of the HVAC return air filter folder 200 are well within the scope of the present disclosure. Although the dimensions of the HVAC return air filter folder 200 are important design parameters for user convenience, the HVAC return air filter folder 200 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An air filter and filter housing combination comprising:
   an air filter having a filter dimension and a filter perimeter;
   an air filter frame having a frame dimension and a frame perimeter; and
   a filter housing having a housing dimension and a housing perimeter, wherein filter perimeter is smaller than the frame perimeter and the frame perimeter is smaller than the housing perimeter; and
   wherein the filter housing is ridged and configured to hingedly attach to an air grill; and
   wherein the air filter further comprises a poly dry media; and
   wherein the at least one filter holder further comprises an interior edge, an exterior surface, a continuous opening, and a plurality of flexible retaining flanges on the interior edge configured to releasably retain the air filter.

2. The air filter and filter housing combination as recited in claim 1, wherein the filter perimeter is immediately adjacent to the air filter frame and the frame perimeter is immediately adjacent to the filter housing.

3. The air filter and filter housing combination as recited in claim 1, wherein the filter housing is made from a moldable material.

4. The air filter and filter housing combination as recited in claim 3, wherein the moldable material is comprised of a select one of a polyurethane, a latex, a chloroprene rubber (CR), a styrene-butadiene rubber (SBR) and an ethylene-propylene-diene-monomer (EPDM).

5. The air filter and filter housing combination as recited in claim 1, wherein the air filter frame is connected to each of the air filter and the filter housing by at least one fastener.

6. The air filter and filter housing combination as recited in claim 1, wherein the at least one fastener is one of a hook and look fastener or an adhesive.

7. A kit for securing an air filter in an air filter housing, wherein the kit comprises:
   at least one adhesive fastener comprising an adhesive layer and a release liner removably covering the adhesive layer;
   at least one hook and loop fastener;
   an air filter; and
   at least one air filter holder comprised of a material that is selected from a group consisting of a polyurethane, a latex, a chloroprene rubber (CR), a styrene-butadiene rubber (SBR) and an ethylene-propylene-diene-monomer (EPDM); and
   wherein the at least one filter holder further comprises an interior edge, an exterior surface, a continuous opening, and a plurality of flexible retaining flanges on the interior edge configured to releasably retain the air filter; and
   wherein the air filter is positioned within the continuous opening; and
   wherein the at least one adhesive fastener and the at least one hook and loop fastener are attachable to the exterior surface of the at least one filter holder and are adapted to attach the at least one filter holder to an air grill; and
   wherein the at least one filter holder is customizable from a plurality of individual sections.

* * * * *